Sept. 24, 1963  W. R. JENKS ETAL  3,104,945
METHOD OF PRODUCING HYDROGEN CYANIDE
Filed July 19, 1961
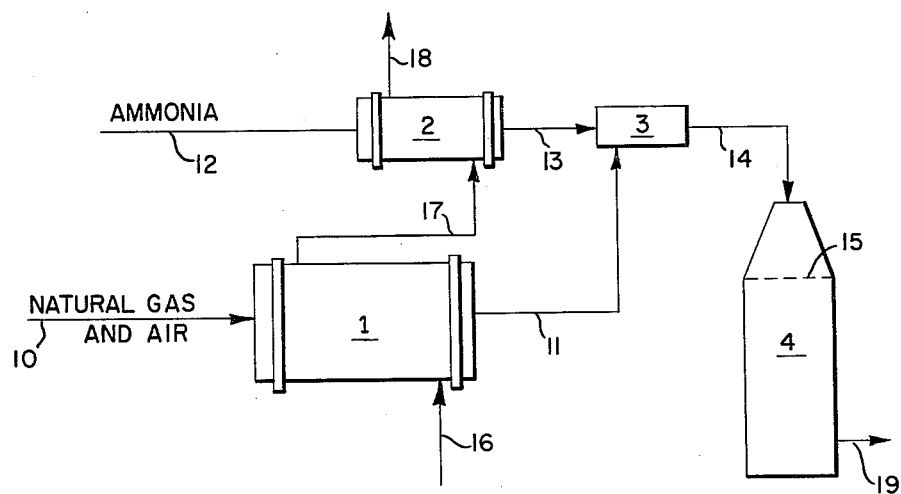
INVENTORS
WILLIAM R. JENKS
RICHARD M. SHEPHERD
BY *Joseph Frederic Walker*
AGENT United States Patent Office 3,104,945
Patented Sept. 24, 1963

3,104,945
METHOD OF PRODUCING HYDROGEN CYANIDE
William R. Jenks, and Richard M. Shepherd, Memphis, Tenn., assignors to E. I. du Pont de Nemours and Company, Wilmington, Del., a corporation of Delaware
Filed July 19, 1961, Ser. No. 125,206
7 Claims. (Cl. 23—151)

This invention relates to the manufacture of hydrogen cyanide by the reaction of air, ammonia and a hydrocarbon gas in the presence of a catalyst consisting of one or more of the platinum metals. It relates particularly to a manufacturing process employing a gas which consists predominantly of methane.

The one-stage synthesis of hydrogen cyanide from ammonia and a hydrocarbon gas in which heat is supplied by simultaneous combustion reactions with oxygen in the presence or absence of catalysts is well known. Andrussow, U.S. Patent 1,934,838 (1933), for example, describes a catalytic process of this type. Other processes utilizing both catalytic and noncatalytic techniques include Carlisle et al., U.S. Patent 2,069,545, Houpt et al., U.S. Patent 2,496,999, McKinnis, 2,596,421, Inman, U.S. Patent 2,803,522, and British Patents 722,980 and 723,081.

In general, prior art processes for the production of hydrogen cyanide from mixed gases consisting essentially of air, ammonia and methane have employed relatively large proportions of air and/or excessive quantities of methane over the 1:1 stoichiometrically essential molar ratio of methane to ammonia. As a result, the hydrogen cyanide content of the product gases is diluted with excessive amounts of nitrogen, unreacted methane and by-product gases. This increases the technical difficulties of product isolation. The presence of by-product carbon dioxide is particularly undesirable if the crude product gas is converted to an alkali cyanide by direct absorption in aqueous caustic since the cyanide thus obtained is contaminated with alkali carbonates. Use of excess methane results in undue waste of this raw material and contributes to the by-product carbon dioxide concentration.

Processes described in the prior art generally employ gaseous reaction mixtures containing sufficient oxygen to completely oxidize 40 to 50% or more of the total amount of ammonia and methane as indicated by the following equations.

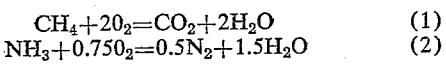

$$CH_4 + 2O_2 = CO_2 + 2H_2O \quad (1)$$
$$NH_3 + 0.75O_2 = 0.5N_2 + 1.5H_2O \quad (2)$$

Conversions of ammonia to hydrogen cyanide are generally in the range 40 to 70% of the theoretical value under the above circumstances when the methane to ammonia molar ratio is about 1:1. This is equivalent to a volume ratio of 1:1. Ammonia conversions in the range 80 to 90% are reported when an excess of methane is used so that the methane-ammonia ratio is about 2:1 to 4:1 or higher.

It should be noted that processes employing air-ammonia-methane mixtures containing sufficient oxygen to oxidize 40 to 50% of the methane and ammonia when these latter are present in equimolar proportions would have an air to ammonia volume ratio of 5.3 to 6.6. Actual prior art processes often employ air to ammonia volume ratios of 7 to 10.

The primary object of this invention is to provide a new and useful method for making hydrogen cyanide. Another objective is to provide a hydrogen cyanide process giving improved yields and conversions of both methane and ammonia on reaction with air. An additional object is to secure a product gas containing a low concentration of carbon dioxide whose presence is highly undesirable when the product is to be isolated as an alkali cyanide by direct absorption in an aqueous solution of alkali. Other objects and advantages will become apparent in the following description and discussion of the invention.

The above enumerated and further objects of this invention are obtained by preheating a reaction mixture of controlled composition containing air, ammonia and methane or a gas consisting predominantly of methane to a temperature in the range 400° C. to 525° C., preferably 430° to 510° C. before passing over a platinum metal catalyst. The composition of the said reaction mixture is controlled to contain about 1 volume of methane or natural gas to one volume of ammonia and air equivalent to 25 to 40% of the amount that would be required for complete oxidation of the ammonia and methane to water, nitrogen and carbon dioxide, the quantity of air preferably decreasing proportionately with increase of preheat temperatures. The volume ratio of methane to ammonia in the initial gas mixture may vary in the range 0.8:1 to 1.2:1 but should lie in the range 0.9:1 to 1.1:1 for best results. The quantity of air is preferably equivalent to 30 to 35% of the amount that would be required for oxidation of the ammonia and methane. This amounts to an air to ammonia volume ratio of 3.9 to 4.6:1 when the methane to ammonia volume ratio is 1:1. In carrying out the hydrogen cyanide synthesis of this invention, it has been discovered that maximum yields are obtained when reaction conditions are maintained in such a manner that the product gas always contains unreacted hydrocarbon equivalent to 0.1 to 0.3% by volume of methane. At constant feed gas ratios within the prescribed limits of this invention, the conversion yield of hydrogen cyanide will increase as the preheat temperature is raised with a simultaneous drop in the methane content of the product gas. The yield value attains a maximum as the methane content falls to the 0.1 to 0.3% range. On further temperature rise, the methane concentration of the product gas will fall below 0.1% and the yield of hydrogen cyanide will drop off. Equivalent control can be obtained by increasing or decreasing the rate of methane feed which will cause a corresponding rise or fall in the methane content of the product gas. These variations in preheat temperature or methane feed also cause variations in the catalyst bed temperature which is maintained in the range 1100° to 1200° C. Other equivalent control alternatives will be obvious to those skilled in the art. Optimum results are thus obtained by determining the methane content of the product gas and adjusting preheat and/or methane feed within the prescribed limits of composition and temperature so that this analytical value is held in the 0.1 to 0.3% by volume concentration range.

Optimum results are obtained in the process of this invention when the hot gaseous reaction mixture of air, ammonia and methane or natural gas is prepared by separately preheating a mixture of the hydrocarbon gas and air and then mixing it with ammonia separately preheated to a lower temperature. The resultant mixture is then admitted to the reactor containing the platinum metal catalyst. The preheating of the gases is preferably carried out by a combination of two heat exchangers arranged so that they can be heated sequentially by a hot fluid heat exchange medium, preferably a hot flue gas, entering the natural gas-air heat exchanger and then passing from this to the ammonia heat exchanger. This process makes it possible to prepare the desired mixture of gaseous reactants without undue decomposition or combustion of the reactants. If desired, the hydrocarbon gas and air may also be preheated separately before mixing.

The platinum metal catalyst employed in the process of this invention may be one of the platinum metals, i.e., platinum, rhodium, iridium, palladium, osmium or ruthenium, or a mixture or alloy of two or more of these metals. These platinum metal catalysts may be employed in the form of sheets, wires, turnings, etc., the preferred form being one or more layers of a fine wire gauze. The metals may also be used in the form of coatings on various inert substrates such as beryl (beryllium aluminum silicate), alumina, sillimanite, etc.

The novelty of this invention lies in the fact that it makes it possible to obtain a high conversion of both ammonia and methane to hydrogen cyanide by a simple, economical process in the form of a product gas containing a relatively high concentration of hydrogen cyanide and a low concentration of by-product carbon dioxide. The process is particularly valuable in view of the fact that it does this by use of air rather than the more expensive oxygen or oxygen enriched air as a raw material. This was accomplished by the discovery that good yields could be obtained by employing approximately equimolar amounts of methane and ammonia with drastically reduced proportions of air when employing a high degree of preheat and a platinum metals catalyst. The product gases obtained with this process contain about 10 to 14% hydrogen cyanide by weight which concentration is 1.5 to 2 times that obtained previously. Reduction of the concentration of by-product carbon dioxide is outstanding in that the volume ratio of hydrogen cyanide to carbon dioxide is 25:1 as compared with about 12 to 15:1 for a process involving no preheat and higher air:ammonia ratios. The low methane or natural gas consumption in the process of this invention is an unexpected advantage. Experiments showed that hydrocarbon gas requirements were only about two-thirds of that for the unmodified process even when the preheaters were fired with natural gas and this usage was included in the raw material calculations.

Previous processes in which the air-ammonia-hydrocarbon feed gases for the catalytic production of hydrogen cyanide have been preheated have been limited to brief initial heating to start the synthesis reaction or continuous preheating with other raw material proportions. British Patent 722,980 discloses a process in which the initial gases are heated to 300 to 350° C. and contain an amount of oxygen sufficient to oxidize at least about 50% of the methane and ammonia charged. Conversions in the range 55 to 72% are reported for this process. British Patent 723,081 also employs preheat at 300° to 350° C. but uses a methane to ammonia volume ratio of 1.4 to 2.5:1.

In noncatalytic processes for the synthesis of hydrogen cyanide from air-ammonia-hydrocarbon gas mixtures, a considerable degree of preheat is required to insure reaction. Carlisle et al., U.S. Patent 2,069,545, teach preheating the initial gas to 400° C. or higher and to 600° C.–1000° C. when methane is employed. Furthermore, for this type of reaction it is disclosed that the hydrocarbon gas should be substantially in excess of that theoretically required to react with both the ammonia and the oxygen. A quantity of hydrocarbon equivalent to 2–5 volumes of the methane raw material is employed for each volume of ammonia. McKinnis, U.S. Patent 2,596,421, employs a noncatalytic flame reaction for hydrogen cyanide synthesis. To carry out this process, preheat is required to maintain the flame when pure oxygen is not employed. In such a reaction, it is taught that preheating of the initial gases is necessary to stabilize the flame when air is employed and the oxygen to ammonia volume ratio is less than 2.2:1 and the ammonia to methane volume ratio is 1:1. This oxygen to ammonia ratio can be reduced to 1.2:1 by 800° C. of preheat. This process also requires an auxiliary flame of hydrocarbon and air surrounding the synthesis flame if high yields are to be obtained. Without such an auxiliary flame, ammonia conversions are indicated to be in the neighborhood of 40%.

It is not obvious from the prior art that high yields of hydrogen cyanide can be obtained from a preheated gas mixture in which both ammonia and methane are present in substantially equivalent amount and excessive amounts of hydrocarbon are not oxidized. The novel process of this invention results from the unexpected advantage resulting from a combination in which the degree of preheat and the initial gas composition are held in carefully defined limits.

The preferred raw material gases for the process of this invention are a substantially pure ammonia, methane or a natural gas containing a preponderance of methane, viz. at least 90% by volume, and air or an oxygen containing inert gas roughly equivalent to air in its oxygen content. Other gases than methane may be present in the natural gas or hydrocarbon gas raw material. However, when large amounts of other hydrocarbons are present, volume ratios should be adjusted by assuming their volume as stoichiometrically equivalent to methane on the basis of their molecular composition with respect to carbon and hydrogen atoms. On this basis, one volume of ethane is approximately equivalent to two volumes of methane. Air is the preferred oxygen containing gas for use in this invention whose utility is based on the discovery of conditions in which it can be used with the greatest efficiency.

The FIGURE is a schematic drawing of apparatus employed in the process of this invention showing the flow of reactants and heating media for purposes of illustration.

As indicated in the figure, the equipment for the process of this invention comprises two heat exchangers 1 and 2, a mixer 3 and a catalytic reactor 4. The heat exchangers are warmed sequentially by a fluid heating medium, such as hot flue gas, which enters heat exchanger 1 through pipe 16, leaves by pipe 17 and then enters heat exchanger 2 which it leaves by pipe 18. A mixture of natural gas or methane and air enters heat exchanger 1 by pipe 10 and leaves by pipe 11 which goes to mixer 3. Ammonia enters heat exchanger 2 by pipe 12, leaves by pipe 13 and is mixed with the hot natural gas-air mixture in mixer 3. The air-ammonia-natural gas mixture then enters reactor 4 where reaction takes place in catalyst bed 15. Cooling means (not shown) located below bed 15 reduce the temperature of the hot gases before they leave the reactor through pipe 19 which goes to the product recovery system.

Operation of the product feed preheat system shown in the figure is such that the heat exchange surfaces of heat exchanger 1 never exceed a temperature of 650° C. and the heated natural gas-air mixture leaving this preheater does not exceed 540° C. Preheater 2 is operated so that the heat exchange surfaces therein do not exceed 450° C. and the maximum temperature of the heated ammonia does not exceed 380° C. The mixed gases entering reactor 4 through pipe 14 should not exceed 525° C. The preferred upper temperature limits for the preheated gases are: 510° C. for the natural gas-air mixture and 350° C. for the ammonia. The combined gases enter reactor 4 taking part in the catalyzed synthesis reaction in the catalyst bed whose temperature is maintained in the range 1000° C. to 1200° C., preferably in the range 1100 to 1160° C. Flow rates of gases through the preheaters and reactor are determined by the structural dimensions of the equipment as well as the age and activity of the catalyst conforming to maintenance of the desired temperatures. As previously noted, a small amount of methane must be present in the product gas if the highest yields are to be obtained. This methane concentration is in the range 0.1 to 0.3% by volume and must be carefully followed for precise control of the process.

A nickel-chromium alloy such as "Inconel" is a preferred material of construction for the preheaters and other surfaces contacting the hot gaseous reactants. The maximum temperatures for the metal surfaces in the preheaters, viz. 650° C. for heat exchanger 1 in which the methane-air mixture is heated and 450° C. for preheater 2 for the ammonia preheater are critical. If these temperatures are exceeded, raw materials are lost by decomposition, combustion and metal corrosion. Corrosion is particularly harmful since corrosion scales are carried over to the catalyst and act as catalyst poisons.

The following example will illustrate the nature of this invention but the invention is not limited by the example.

Example

Three air-ammonia-natural gas feed mixtures were converted to hydrogen cyanide in the presence of a wire gauze catalyst consisting of a platinum-rhodium alloy containing 10% by weight of rhodium and 90% by weight of platinum. The natural gas used in these tests contained 93.4% methane by volume. In Tests 1 and 2, the raw material gases were preheated and proportioned according to the process of this invention. In Test 3, the preheat temperature was only 95° C. and the air ratio was adjusted to give optimum hydrogen cyanide yield under these circumstances. The following table summarizes conditions and results of these tests.

|  | Test 1 | Test 2 | Test 3 |
|---|---|---|---|
| Reactant Gas Composition: |  |  |  |
| Volume Ratio Air/NH₃ | 4.40:1 | 4.40:1 | 7.00:1 |
| Volume Ratio CH₄/NH₃ | 1.07:1 | 1.07:1 | 1.30:1 |
| Preheat Temperature, °C | 505 | 435 | 95 |
| Catalyst Bed Temperature, °C | 1,120 | 1,115 | 1,105 |
| Conversion of NH₃ to HCN, percent | 75 | 75 | 65 |
| Theoretical Yield on NH₃, percent | 92 | 90 | 84 |
| Weight Percent HCN in Product Gases | 12.1 | 12.2 | 7 |

As will be noted, Tests 1 and 2 in which the reactants were preheated to 505° C. and 435° C. respectively give a substantially higher yield and a product gas containing over 1.7 times the hydrogen cyanide concentration obtained in the product of Test 3.

We claim:

1. In the manufacture of hydrogen cyanide by the platinum metal catalyzed reaction of a mixture of gaseous reactants consisting essentially of air, ammonia and methane, the steps comprising mixing said reactants in such proportion that the volume ratio of methane gas to ammonia lies in the range 0.8:1 to 1.2:1 and the quantity of air is such that the oxygen content of the said mixture is in the range from 25 to 40% of the amount that would be required for total oxidation of the ammonia and methane contained therein, preheating said mixture to a temperature in the range 400° to 525° C. and passing the preheated mixture over a platinum metal catalyst.

2. The process of claim 1 in which the degree of preheat and methane feed are adjusted so that the product gas will contain from 0.1 to 0.3% by volume of unreacted methane.

3. The process of claim 1 in which the gaseous mixture of reactants is preheated by a process comprising the steps of separately preheating a mixture of the air and methane reactants to a temperature not exceeding about 540° C., separately preheating the ammonia reactant to a temperature not exceeding about 380° C. and then mixing the separately preheated reactants, said separate preheating steps being carried out in two heat exchangers in which the heat exchange surfaces never exceed a temperature of 650° C. in the methane-air preheater and never exceed a temperature of 450° C. in the ammonia preheater.

4. In the manufacture of hydrogen cyanide by the platinum metal catalyzed reaction of a mixture of reactants consisting essentially of air, ammonia and a natural gas consisting predominantly of methane, the steps comprising mixing said reactants in such proportion that the volume ratio of natural gas to ammonia lies in the range 0.9:1 to 1.1:1 and the quantity of air is such that the oxygen content of the said mixture is in the range from 30 to 35% of the amount that would be required for total oxidation of the ammonia and natural gas contained therein, preheating said mixture to a temperature in the range 430° to 510° C. and passing the preheated mixture over a platinum metal catalyst.

5. The process of claim 4 in which the degree of preheat and natural gas feed are adjusted so that the product gas will contain unreacted natural gas equivalent to 0.1 to 0.3% methane by volume.

6. The process of claim 4 in which the gaseous mixture of reactants is preheated by a process comprising the steps of separately preheating a mixture of the air and natural gas reactants to a temperature not exceeding about 540° C. separately preheating the ammonia reactant to a temperature not exceeding 380° C. and then mixing the separately preheated reactants, said separate preheating steps being carried out in two heat exchangers in which the heat exchange surfaces never exceed a temperature of 650° C. in the natural gas-air preheater and never exceed a temperature of 450° C. in the ammonia preheater.

7. In the manufacture of hydrogen cyanide by the platinum metal catalyzed reaction of a mixture of reactants consisting essentially of air, ammonia and a natural gas consisting predominantly of methane, the steps comprising mixing said reactants in such proportions that the volume ratio of natural gas to ammonia lies in the range 0.9:1 to 1.1:1 and the quantity of air is such that the oxygen content of the said mixture is in the range from 30 to 35% of the amount that would be required for total oxidation of the ammonia and natural gas therein, preheating said mixture to a temperature in the range 430° to 510° C. and passing the preheated mixture over a platinum-rhodium alloy gauze catalyst at a temperature in the range 1100° to 1160° C., the degree of preheat and natural gas feed being adjusted so that the product gas will contain unreacted natural gas equivalent to 0.1 to 0.3% methane by volume.

References Cited in the file of this patent

FOREIGN PATENTS 531,492    Canada _____ Oct. 9, 1956